(12) United States Patent
Shiota et al.

(10) Patent No.: US 6,346,345 B2
(45) Date of Patent: *Feb. 12, 2002

(54) ELECTRODE HAVING PTC CHARACTERISTIC

(75) Inventors: Hisashi Shiota; Hiroaki Urushibata; Tetsuo Mitani; Fusaoki Uchikawa, all of Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/997,992

(22) Filed: Dec. 24, 1997

(30) Foreign Application Priority Data

Dec. 26, 1996 (JP) ................................ 8-347598

(51) Int. Cl.⁷ .............................................. H01M 10/50
(52) U.S. Cl. .......................................... 429/62; 429/232
(58) Field of Search ................. 429/49, 53, 62, 429/209, 212, 214, 215, 216, 217, 218.1, 232, 234, 231.95

(56) References Cited

U.S. PATENT DOCUMENTS

| | | | | |
|---|---|---|---|---|
| 3,239,380 A | * | 3/1966 | Berchielli | |
| 3,944,432 A | * | 3/1976 | Brinkmann et al. | 429/234 |
| 4,416,915 A | * | 11/1983 | Palmer et al. | 429/218.1 |
| 4,562,113 A | * | 12/1985 | Yonahara et al. | 429/210 |
| 5,415,948 A | * | 5/1995 | Gauthier et al. | |
| 5,498,489 A | * | 3/1996 | Dasgupta | |
| 5,532,085 A | * | 7/1996 | Davis et al. | 429/224 |
| 5,542,163 A | * | 8/1996 | Chang | |
| 5,569,564 A | * | 10/1996 | Swierbut et al. | 429/224 |
| 5,582,931 A | * | 12/1996 | Kawakami | |
| 5,599,644 A | * | 2/1997 | Swierbut et al. | 429/224 |
| 5,643,480 A | * | 7/1997 | Gustavsson et al. | 429/212 X |
| 5,665,212 A | * | 9/1997 | Zhong et al. | 429/232 X |
| 5,705,259 A | * | 1/1998 | Mrotek et al. | 429/209 |
| 5,856,773 A | * | 1/1999 | Chandler et al. | 429/62 X |

FOREIGN PATENT DOCUMENTS

| | | | |
|---|---|---|---|
| JP | 06231749 A | | 8/1994 |
| JP | 07-161389 | * | 6/1995 |
| JP | 07220755 A | | 8/1995 |

* cited by examiner

*Primary Examiner*—Carol Chaney
*Assistant Examiner*—Susy Tsang
(74) *Attorney, Agent, or Firm*—Oblon, Spivak, McClelland, Maier & Neustadt, P.C.

(57) ABSTRACT

An electrode in which an active material 11 or 7, an electron conducting material 12 or a current collector 5 or 6 has PTC characteristics is used as at least one of positive and negative electrodes 1 and 2.

16 Claims, 3 Drawing Sheets

SHORT CIRCUIT REGION

SHORT CIRCUIT REGION

ELECTRODE HAVING PTC CHARACTERISTIC

BACKGROUND OF THE INVENTION

1. Field of the Invention

This invention relates to an electrode to be used in a battery and to a battery using the same. In particular, it relates to a lithium ion secondary battery with improved safety.

2. Discussion of the Background

With the recent improvement of performance of electronic equipment, there has been a demand for improvement on batteries for use as a power source of the electronic equipment, especially rechargeable secondary batteries. Lithium ion secondary batteries have been attracting attention for their light weight, portability, and high capacity. Lithium ion secondary batteries, while advantageous for their high energy density, require sufficient safety measures because they use metallic lithium and a nonaqueous electrolytic solution.

A safety valve for escape of increased inner pressure and a PTC (positive temperature coefficient) element which increases resistance according to heat generation caused by an external short-circuit to cut off an electric current have been proposed to date as safety measures.

For example, JP-A-4-328278 (the term "JP-A" as used herein means an "unexamined published Japanese patent application") proposes a cylindrical battery having a safety valve and a PTC element in the positive electrode cap. However, it is a generally followed practice that a safety valve is designed not to work so easily because, on the safety valve's working, moisture in the air tends to enter the battery and react with lithium present in the negative electrode.

A PTC element, on the other hand, cuts off the circuit in case of an external short-circuit and causes no adverse influence. It could be the first safety component to work in case of abnormality by designing to work when the inner temperature reaches, for example, 120° C. due to a short-circuit.

When a short-circuit occurs in the inside of a battery, the cutoff of the external circuit by a PTC element does not mean a cutoff of a short-circuit inside the battery. If a short-circuit occurs in the battery, and the inner temperature rises, the separator made of polyethylene, polypropylene, etc. which is interposed between a positive electrode and a negative electrode is expected to melt by the heat. The molten separator is expected to exude or enclose the nonaqueous electrolytic solution that has been held in the separator so that the ion conducting properties of the separator may be reduced to weaken the short-circuit current. However, a separator away from the heat generating part does not always melt.

In an attempt to solve the above problem, JP-A-7-161389 proposes using an active material having PTC characteristics in itself in the positive electrode. However, since the resistance of a positive electrode active material having PTC characteristics is about $10^{-5}$ S/cm at a working temperature (room temperature), the battery will not function unless such a positive electrode active material is used in combination with an electrical conduction aid as demonstrated in Examples of the publication. With a conduction aid having no PTC behavior being added, even though a positive electrode active material exhibits PTC characteristics, a short-circuit current is to flow via the conduction aid.

SUMMARY OF THE INVENTION

An object of the present invention is to settle the above-mentioned problems and to provide a highly safe lithium ion secondary battery which controls heat generation in case of an external and/or internal short-circuit.

A first aspect of the present invention is an electrode which comprises:
an electrode active material layer containing an active material;
and an electronic conducting current collector on which the electrode active material layer are formed wherein said electrode active material layer has the property of increasing its resistance with a rise in temperature (PTC).

A second aspect of the present invention according to the first aspect is an electrode wherein said active material has the property of increasing its resistance with a rise in temperature (PTC).

A third aspect of the present invention according to the first aspect is an electrode wherein said electrode active material layer comprises an active material particle and an electronic conducting material, and the electronic conducting material has the property of increasing its resistance with a rise in temperature (PTC).

A fourth aspect of the present invention according to the first aspect is an electrode wherein said electrode active material layer is composed of an active region having an electrode activity and a non-active region having no electrode activity by which said active region is isolated into a plurality of parts, and said non active region has the property of increasing resistance with a rise in temperature.

A fifth aspect of the present invention according to the first aspect is an electrode wherein said electrode active material layer is composed of an active region having an electrode activity and a non-active region having no electrode activity by which said active region is isolated into a plurality of parts, and said active region has the property of increasing resistance with a rise in temperature.

A sixth aspect of the present invention according to the first aspect is an electrode wherein said active material is made up of secondary particles comprising a plurality of active material particles having adhered on the surface thereof electronic conducting particles having the property of increasing resistance with a rise in temperature.

A seventh aspect of the present invention according to the first aspect is an electrode wherein said electronic conducting current collector has the property of increasing its resistance with a rise in temperature (PTC).

An eighth aspect of the present invention according to the seventh aspect is an electrode, wherein said electronic conducting current collector is composed of conductive plate to which an electronic conducting material having the property of increasing resistance with a rise in temperature is bonded.

A ninth aspect of the present invention according to the sixth aspect is an electrode, wherein said electronic conducting material is a polymer having a softening point not higher than 150° C.

A tenth aspect of the present invention is a battery which comprises: a positive electrode; a negative electrode; and an electrolyte provided between said positive electrode and said negative electrode, wherein at least one of the positive electrode and negative electrode comprises an electrode active material layer containing an active material and an electronic conducting current collector on which the electrode active material layer are formed, and said electrode active material layer has the property of increasing its resistance with a rise in temperature (PTC).

An eleventh aspect of the present invention according to the tenth aspect is a battery, wherein said electrode active material layer is composed of an active region having an electrode activity and a non-active region having no electrode activity by which said active region is isolated into a plurality of parts, and said non active region has the property of increasing resistance with a rise in temperature.

A twelfth aspect of the present invention according to the tenth aspect is a battery, wherein said electrode active material layer is composed of an active region having an electrode activity and a non-active region having no electrode activity by which said active region is isolated into a plurality of parts, and said active region has the property of increasing resistance with a rise in temperature.

A thirteenth aspect of the present invention according to the tenth aspect is a battery, wherein said active material is made up of secondary particles comprising a plurality of active material particles having adhered on the surface thereof electronic conducting particles having the property of increasing resistance with a rise in temperature.

A fourteenth aspect of the present invention according to the tenth aspect is a battery, wherein said electronic conducting current collector has the property of increasing its resistance with a rise in temperature (PTC).

A fifteenth aspect of the present invention according to the fourteenth aspect is a battery, wherein said electronic conducting current collector is composed of metal to which an electronic conducting material having the property of increasing resistance with a rise in temperature is bonded.

A sixteenth aspect of the present invention according to the thirteenth aspect is a battery, wherein said electronic conducting material is a polymer having a softening point not higher than 150° C.

A seventeenth aspect of the present invention is a battery which comprises:

an electrode active material layer containing an active material;

and an electronic conducting current collector on which the electrode active material layer are formed, wherein said electronic conducting current collector has the property of increasing its resistance with a rise in temperature (PTC) electrode active material layer and said electrode active material layer is made of an plurality of parts electrical isolated each other.

A eighteenth aspect of the present invention according to the seventeenth aspect is a battery, wherein said electronic conducting current collector is made of a conductive plate to which an electronic conducting material has the property of increasing its resistance with a rise in temperature (PTC) is bonded.

A ninteenth aspect of the present invention is a battery which comprises: a positive electrode; a negative electrode; and an electrolysis held between said positive electrode and said negative electrode, wherein at least one of the positive electrode and negative electrode comprises an electrode active material layer made of an plurality of parts electrical isolated each other and an electronic conducting current collector on which the electrode active material layer are formed, and said electronic conducting current collector has the property of increasing its resistance with a rise in temperature (PTC).

BRIEF DESCRIPTION OF THE DRAWINGS

A more complete appreciation of the invention and many of the attendant advantages thereof will be readily obtained as the same becomes better understood by reference to the following detailed descriptions when considered in connection with the accompanying drawings, wherein.

DESCRIPTION OF THE PREFERRED EMBODIMENTS

Figure 1:
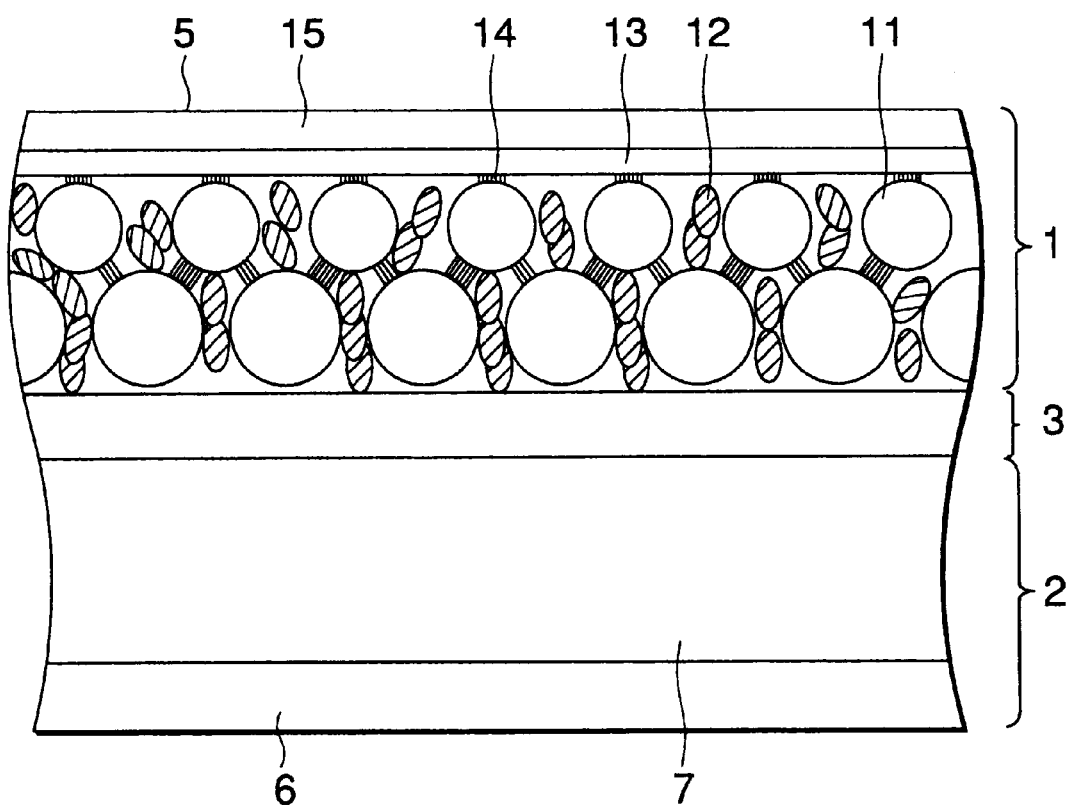
FIG. 1 is a schematic cross section of the main part of an example of the lithium ion secondary battery according to the present invention.

Referring now to the drawings, wherein like reference numerals designate identical or corresponding parts throughout the several views, and more particularly to FIG. 1 thereof, there is illustrated a schematic cross section of the main part an embodiment of the lithium ion secondary battery according to the present invention. In FIG. 1 numeral 1 indicates a positive electrode comprising a positive electrode current collector 5 having formed thereon a positive active material layer made up of a positive electrode active material 11, an electronic conducting material 12 that is in contact with the active material 11, and a binder 14. Numeral 2 is a negative electrode comprising a negative electrode current collector 6 having formed thereon a negative electrode active material layer made up of a negative active material 7, such as carbon particles, and a binder. Numeral 3 indicates a separator holding an electrolytic solution containing lithium ions.

The electrode according to the present invention having the above-described structure is characterized in that the positive electrode active material 11, the positive electrode current collector 5 or the electronic conducting material 12 in contact with the positive electrode active material 11 has PTC characteristics (the property of increasing electrical resistance with a rise in temperature).

While FIG. 1 is to illustrate the structure of the positive electrode 1, the same structure also applies to the negative electrode 2. In that case, a particulate negative electrode active material 7 and an electronic conducting material in contact with the active material 7 are formed into a negative electrode by means of a binder, and the negative electrode material 7, the electronic conducting material or the current collector 6 has PTC characteristics.

Figure 2:
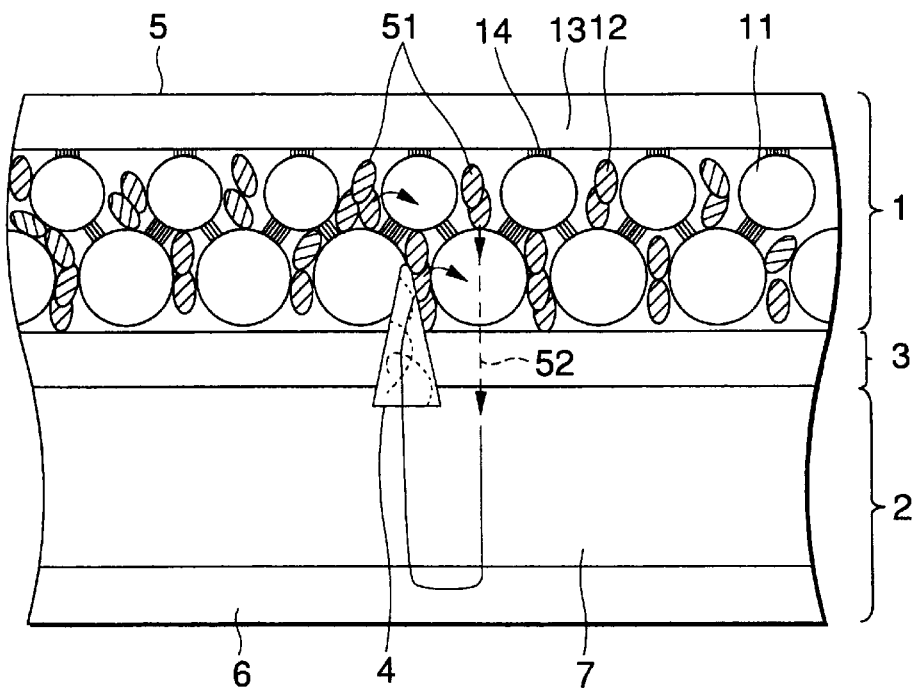
FIG. 2 is a schematic cross section of the same battery as shown in FIG. 1, in which the behavior of the positive electrode in case of an internal short-circuit is illustrated.

FIG. 2 is a schematic cross section of the same battery as shown in FIG. 1, in which the behavior of the positive electrode in case of an internal short-circuit is illustrated. When an internal short-circuit takes place due to, for example, a mediator 4, for example, dendrite shape of metallic lithium grown from the negative electrode 2 as shown in FIG. 2, short-circuit currents 51 and 52 flow along the path indicated by the arrows toward the internal short-circuited part. The short-circuit current 51 is an electronically conducting current, while the short-circuit current 52 is an ionically conducting current. The part in which the short-circuit currents 51 and 52 are concentrated generates Joule's heat. In short, the inner temperature rises at the part where the short-circuit currents 51 and 52 flow (in the vicinities of the short-circuit caused by the mediator 4).

According to the present invention, since the positive electrode active material 11, the electronic conducting material 12 or the electronic conducting material 13 constituting the positive electrode current collector 5 has PTC characteristics, the short-circuit current 51 is decayed with the rise in temperature caused by the short-circuit.

In a battery, a voltage loss due to internal resistance is about 1 to 5% of the battery voltage at a generally employed current. Supposing the total voltage is applied to the internal resistant portion, if a short-circuit takes place, the short-circuit current would be 20 to 100 times the ordinary current. Therefore, it is expected that a short-circuit current would be reduced down to a normal level or even less if the internal resistance at the short-circuited part could be increased 100 times or more by a PTC function.

The possibility of thermal runaway, while varying depending on the materials making up a battery, seems to increase after the battery temperature exceeds 150° C. Therefore, it is desirable that the PTC function works at a temperature of 150° C. so as to inhibit thermal runaway. Taking the time lag between the start and the completion of the PTC function into consideration, it is desirable for the PTC function to work from 120° C.

In FIG. 1, at least one of the current collectors 5 and 6, the active materials 7 and 11, and the electronic conducting material 12 must be endowed with PTC characteristics.

Because a short-circuit current has its rise in the active materials 11 and 7 of the positive and negative electrodes 1 and 2, it is the most effective that the active material 7 or 11 is made to have PTC characteristics. With an increase in temperature due to a short-circuit, the active material 7 or 11 increases its resistance to reaction to reduce the short-circuit current.

The "resistance to reaction" of an electrode active material is considered to be the sum of resistance to electronic conduction and ionic conduction in the inside of the active material 7 or 11 and resistance to charge transfer on the surface of the active material 7 or 11. Many of the active materials 11 have high resistance to electronic conduction originally so that the resistance to ionic conduction in the inside of the active material 11 and the resistance to charge transfer on the surface of the active material 11 usually takes the main part of resistance to reaction. In one feature of the present invention, the resistance to reaction has PTC behavior. More specifically, electronic conducting particles having PTC characteristics are adhered to the surface of the active material particles to form secondary particles of the active material 7 or 11 having an active part and a non-active part having PTC characteristics.

It is also effective that the electronic conducting material has PTC characteristics. Since the positive electrode active material 11 usually has in itself low electron conductivity, the electronic conducting material 12 is incorporated to form the positive electrode 1 in which the active material 11 and the electronic conducting material 12 are brought into contact. Use of an electronic conducting material having PTC characteristics enables the electrode to decay the short-circuit current.

Figure 4:
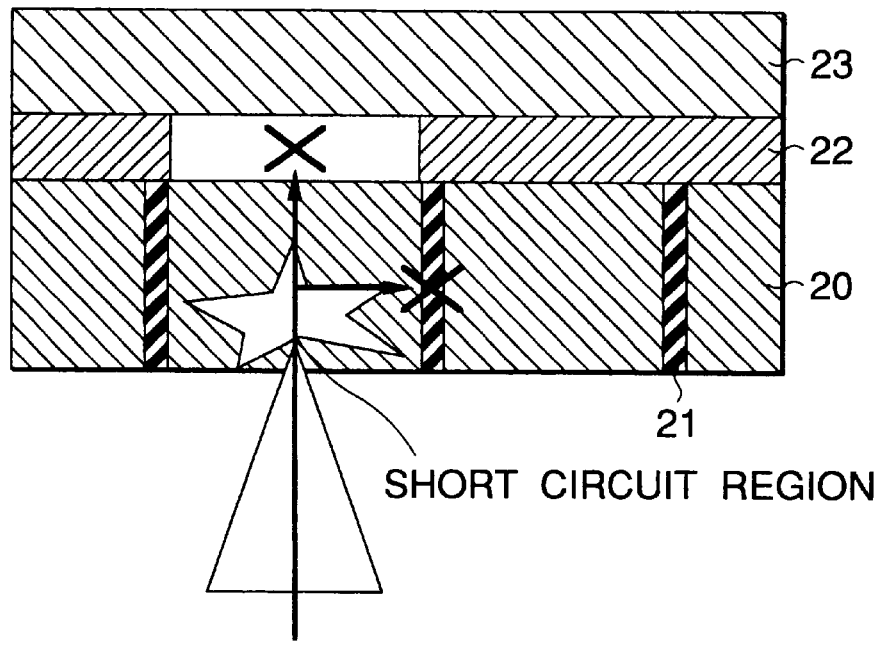
FIG. 4 shows a schematic cross section of the electrode of the third embodiment of the present invention.

In order for the positive electrode current collector 5 to have PTC characteristics, the current collector 5 can be made up of metal 15 to which the electronic conducting material 13 having PTC characteristics is contacted as shown in FIG. 1. The negative electrode current collector 6 can also be made to have PTC characteristics in the same manner.

Where only the current collector 5 and 6 are made to have PTC characteristics, and the active material layers each formed of the active material 11 or 7 and the binder 14 have good electron conductivity in the lateral direction, cases are sometimes met with in which the active material layers become bypass for letting the short-circuit current to flow, failing to sufficiently decay the short-circuit current, even when the current collectors 5 and 6 increase their resistance in case of a short-circuit. Then as shown in FIG. 4, it is desirable to limit the electron conductivity of the active material layers in their lateral direction by isolating the active material layer 20 into plural of active material regions by electron insulator 21.

According to the feature, the electron insulator 21 prevents the short-circuit current from bypassing. And the short-circuit current is cut early by means of the PTC function of the PTC layer 22 formed on the conductive layer 23 such as a metal plate or carbon plate. Therefore energy discharge owing to short-circuit is kept low, and safety of the secondary battery is kept.

With respect to isolation region, such as electron insulating material, by which active material regions are isolated, any size, any pitch and any kindness of electron insulating material are effective without being limited. As the electron insulating material, any material has electron insulating characteristic under the circumference in which the electrode is used, for example in the electrode for a litium ion secondary battery, electron insulating material used as other element of the battery, can be used. The size of the isolation region is desirably small in a range wherein a function of preventing a short-circuit current from bypassing can be kept. In addition, the pitch is desirably large with respect to acting as the electrode.

Figure 5:
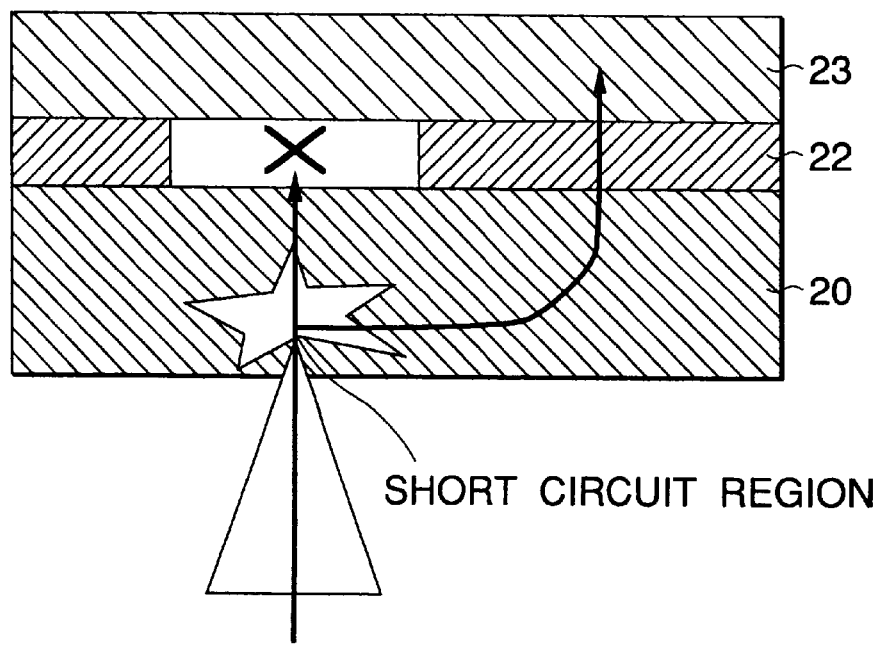
FIG. 5 shows a schematic cross section of the conventional electrode in comparison with the FIG. 4.

In contrast, as shown in FIG. 5 in the case of conventional electrode in which only the current collectors is made to have PTC characteristics, and the active material layers 20 formed on a whole surface of PTC layer 22 on the conductive layer 23, the active material layers 20 has a good electron conductivity in the lateral direction, the short-circuit current continously flows by bypassing the cutting zone formed by the PTC function. And by the continous flow a range of heated zone is expanded, the short-circuit current continues to flow by further bypassing. Therefore in the case of a battery, large amount of energy is discharged.

Accordingly in such a case, it is required to previously limit the electron conductivity of the active material layers in their lateral direction by, for example, dividing the active material layers.

Materials having no PTC characteristics are used as an active material which forms the active material particles per se or the aforesaid secondary particles. Examples of useful positive electrode active materials are $LiCoO_2$, $LiNiO_2$, $LiCo_{1-x}Ni_xO_2$, and $LiMn_2O_4$. Examples of useful negative electrode active materials are carbon particles, such as mesophase carbon microbeads (MCMB), graphite, and acetylene black.

Specific but non-limiting examples of useful electronic conducting materials or electronic conducting particles having PTC characteristics include barium titanate, barium titanate doped with Sr, Pb, etc. (complex oxides), and electrically conductive polymers, such as polyethylene mixed with carbon black.

The PTC function of the conductive polymer is controlled by the mixing ratio of a plastic and an electrically conducting material, such as carbon black. When the conductive polymer is used, the plastic melts by the heat of the short-circuit to cut off both the electron conducting path and the ion conducting path in the active material comprising the secondary particles, thereby to enhance the resistance to electronic conduction. When the conductive polymer is applied to the electronic conducting material 12 or 13, the electronic conducting path is to be cut.

The present invention will now be illustrated in greater detail by way of Examples of the lithium ion secondary battery shown in FIG. 1.

EMBODIMENT 1

Preparation of Positive Electrode

Ten parts of fine particles (average particle size: 10 μm) of an electronic conducting material having an electrical conductivity of 5 S/cm at room temperature and 5 μS/cm at a working temperature of 120° C. (selected from barium titanate, Sr-doped barium titanate, Pb-doped barium titanate, and a graphite/polyethylene mixture), 85 parts by weight of $LiCoO_2$ as an active material, and 5 parts by weight of polyvinylidene fluoride (hereinafter abbreviated as PVDF) were dispersed in N-methylpyrrolidone (hereinafter abbreviated as NMP) to prepare a positive electrode active material paste. The paste was applied to 20 μm thick aluminum foil as a positive electrode current collector with a doctor blade to a thickness of 150 μm, dried at 80° C., and pressed to prepare a positive electrode 1 having a positive electrode active material layer 11 having a thickness of 100 μm.

Preparation of Negative Electrode

Ninety-five parts by weight of mesophase carbon microbeads (hereinafter abbreviated as MCMB) and 5 parts by weight of PVDF were dispersed in NMP to prepare a negative electrode active material paste. The paste was applied to 20 μm thick copper foil with a doctor blade to a thickness of 300 μm, dried at 80° C., and pressed to form a negative electrode 2 having a negative electrode active material layer 6 having a thickness of 100 μm.

Preparation of Battery

A 5 parts by weight of PVDF solution in NMP was applied to both sides of a porous polypropylene sheet (Cellguard #2400, produced by Hoechst Celanese Plastics Ltd.) as a separator 3. Before the adhesive dried, the positive electrode 1 and the negative electrode 2 were stuck to each side of the separator 3, followed by drying at 80° C. to prepare an electrode laminate.

Ten electrode laminates were laid one on another, and current collecting tabs each connected to the end of every positive or negative current collector were spot-welded among the positive electrode laminates and the negative electrode laminates, respectively, to form a single battery body in which the positive electrodes and the negative electrodes were each connected in parallel.

The battery body was immersed in an electrolytic solution consisting of 1.0 mol/dm³ of lithium hexafluorophosphate in a 1:1 (by mole) mixed solvent of ethylene carbonate and dimethyl carbonate, and the impregnated battery body was sealed into an aluminum laminate film (resin coated aluminum film) pack by heat sealing to complete a battery.

Figure 3:
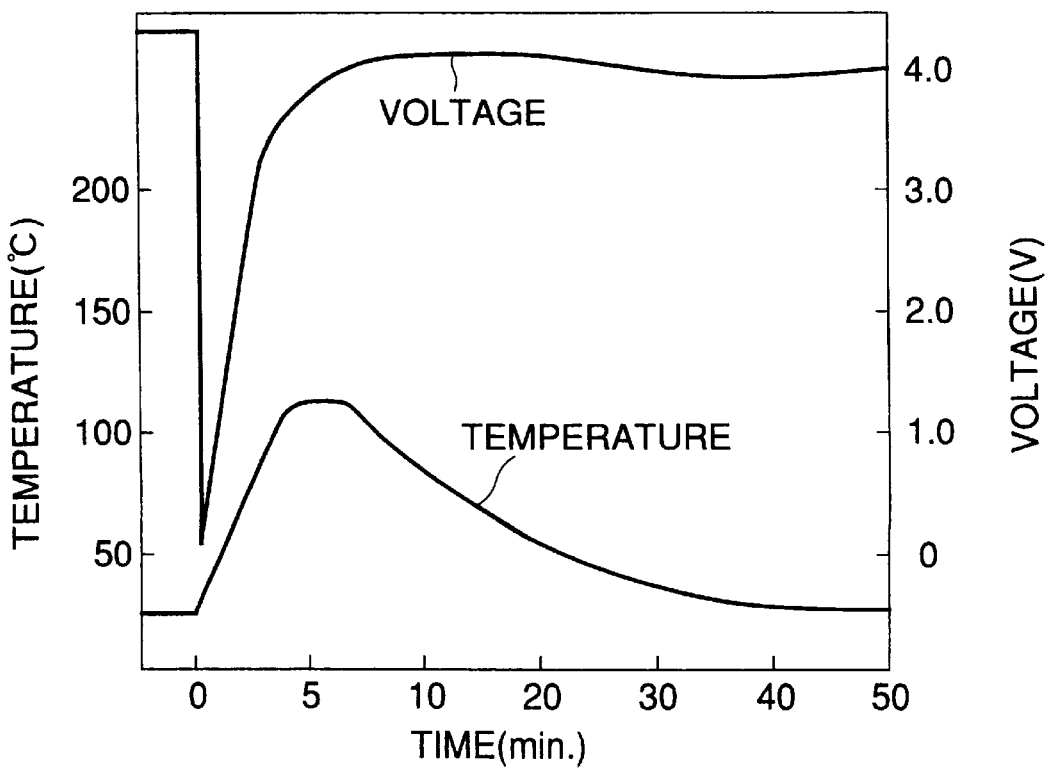
FIG. 3 shows changes in battery voltage and temperature with time in a simulation of a short-circuit in the lithium ion secondary battery according to the present invention.

The resulting battery was charged at 500 mA to 4.2 V at an ambient temperature of 25° C. After completion of the charge, an iron nail having a diameter of 2.5 mm was put in the center of the battery to run a simulation of an internal short-circuit. FIG. 3 shows the changes in battery voltage and temperature with time. As shown, in the instant the iron nail was put in (time 0), the terminal voltage fell to 0 V but was gradually restored with time, which seemed to be because heat was generated at the short-circuited part immediately after the short-circuit whereby the electronic conducting particles having PTC characteristics in the vicinities of the short-circuited part functioned to decay the short-circuit current. The battery temperature started rising after the short-circuit, reaching the peak in about 5 minutes. Then it gradually dropped to room temperature. This shift of the peak of temperature is considered due to the time required for heat conduction because of the positional difference of the measuring point from the heat generating point (the short-circuited part).

For comparison, a battery having no PTC function was produced in the same manner as described above, except for using artificial graphite (KS-6, produced by Lonza Ltd.) as electronic conducting particles. As a result of the same simulation of a short-circuit, the peak temperature exceeded 150° C., and restoration of the battery voltage was not observed.

EMBODIMENT 2

Preparation of Positive Electrode $LiCoO_2$ particles having an average particle size of 1 μm were made into secondary particles having an average particle size of 50 μm while powdering on high-density polyethylene having a softening point of 120° C. Eighty-five parts by weight of the resulting secondary particles, 10 parts by weight of artificial graphite (KS-6, produced by Lonza Ltd.) as electronic conducting particles, and 5 parts by weight of PVDF as a binder were dispersed in NMP to prepare a positive electrode active material paste. The paste was applied to 20 μm thick aluminum foil as a positive electrode current collector 5 with a doctor blade to a thickness of 150 μm, dried at 80° C., and pressed to prepare a positive electrode 1 having a positive electrode active material layer 1 having a thickness of 100 μm.

Preparation of Negative Electrode

Ninety-five parts by weight of MCMB and 5 parts by weight of PVDF were dispersed in NMP to prepare a negative electrode active material paste. The paste was applied to 20 μm thick copper foil with a doctor blade to a thickness of 150 μm, dried at 80° C., and pressed to form a negative electrode 2 having a negative electrode active material layer 6 having a thickness of 100 μm.

Preparation of Battery

A 5 parts by weight of PVDF solution in NMP was applied to both sides of a porous polypropylene sheet (Cellguard #2400, produced by Hoechst Celanese Plastics Ltd., as a separator 3. Before the adhesive dried, the positive electrode 1 and the negative electrode 2 were stuck to each side of the separator 3, followed by drying at 80° C. to prepare an electrode laminate.

Ten electrode laminates were laid one on another, and current collecting tabs each connected to the end of every positive and negative current collector were spot-welded among the positive electrode laminates and the negative electrode laminates, respectively, to form a single battery body in which the positive electrode laminates and the negative electrode laminates were each connected in parallel.

The battery body was immersed in an electrolytic solution consisting of 1.0 mol/dm³ of lithium hexafluorophosphate in a 1:1 (by mole) mixed solvent of ethylene carbonate and dimethyl carbonate, and the impregnated battery body was sealed into an aluminum laminate film pack by heat sealing to complete a battery.

The resulting battery was charged at 500 mA to 4.2 V at an ambient temperature of 25° C. After completion of the charge, an iron nail having a diameter of 2.5 mm was put in the center of the battery to run a simulation of an internal short-circuit. Similarly to the behavior shown in FIG. 3, in the instant the iron nail was put in (time 0), the terminal voltage fell to 0 V but was gradually restored with time. The voltage restoration seems to be because heat was generated at the short-circuited part immediately after the short-circuit whereby the high-density polyethylene clinging to the active material particle in the vicinities of the short-circuited part was softened and expanded to cut the electronic conducting path to the active material to thereby decay the short-circuit current.

EMBODIMENT 3

Preparation of Positive Electrode

Eighty-five parts by weight of $LiCoO_2$ having an average particle size of 1 µm, 10 parts by weight of artificial graphite (KS-6, produced by Lonza Ltd.) as electronic conducting particles, and 5 parts by weight of PVDF as a binder were dispersed in NMP to prepare a positive electrode active material paste.

Separately, a 50 µm thick sheet of an electrically conductive polymer consisting of 30% polyethylene and 70% carbon black and having an electrical conductivity of 5 S/cm at room temperature and 5 µS/cm at a working temperature of 120° C. was struck to a 20 µm thick aluminum net to prepare a positive electrode current collector 5. The positive electrode active material paste prepared above was applied to the current collector 5 through a mask having slits at an opening ratio of 70% by means of a doctor blade to a thickness of 150 µm, dried at 80° C. so that the positive electrode active material layer made of an plurality of parts electrical isolated each other (referring to the FIG. 4), and pressed to prepare a positive electrode 1 having a positive electrode active material layer 1 having a thickness of 100 µm.

Preparation of Negative Electrode

Ninety-five parts by weight of MCMB and 5 parts by weight of PVDF as a binder were dispersed in NMP to prepare a negative electrode active material paste. The paste was applied to 20 µm thick copper foil with a doctor blade to a thickness of 150 µm, dried at 80° C., and pressed to form a negative electrode 2 having a negative electrode active material layer 6 having a thickness of 100 µm.

Preparation of Battery

A 5 parts by weight of PVDF solution in NMP was applied to both sides of a porous polypropylene sheet (Cellguard #2400, produced by Hoechst Celanese Plastics Ltd.) as a separator 3. Before the adhesive dried, the positive electrode 1 and the negative electrode 2 were stuck to each side of the separator 3, followed by drying at 80° C. to prepare an electrode laminate.

Ten electrode laminates were laid one on another, and current collecting tabs each connected to the end of every positive or negative current collector were spot-welded among the positive electrode laminates and the negative electrode laminates, respectively, to form a single battery body in which the positive electrode laminates and the negative electrode laminates were each connected in parallel.

The battery body was immersed in an electrolytic solution consisting of 1.0 mol/dm³ of lithium hexafluorophosphate in a 1:1 (by mole) mixed solvent of ethylene carbonate and dimethyl carbonate, and the impregnated battery body was sealed into an aluminum laminate film pack by heat sealing to complete a battery.

The resulting battery was charged at 500 mA to 4.2 V at an ambient temperature of 25° C. After completion of the charge, an iron nail having a diameter of 2.5 mm was put in the center of the battery to run a simulation of an internal short-circuit. As a result, the same changes in battery temperature and voltage as in FIG. 3 were observed. That is, in the instant the iron nail was put in (time 0), the terminal voltage fell to 0 V but was gradually restored with time. The voltage restoration seems to be because heat was generated at the short-circuited part immediately after the short-circuit whereby the electrically conductive polymer having PTC characteristics in the vicinities of the short-circuited part functioned to cut off the electronic conducting path to the active material to thereby decay the short-circuit current.

EMBODIMENT 4

Preparation of Positive Electrode

Eighty-five parts by weight of $LiCoO_2$ particles having an average particle size of 1 µm, 10 parts by weight of artificial graphite (KS-6, produced by Lonza Ltd.) as electronic conducting particles, and 5 parts by weight of PVDF as a binder were dispersed in NMP to prepare a positive electrode active material paste. The paste was applied to 20 µm thick aluminum foil as a positive electrode current collector 3 with a doctor blade to a thickness of 150 µm, dried at 80° C., and pressed to prepare a positive electrode 1 having a positive electrode active material layer 11 having a thickness of 100 µm.

Preparation of Negative Electrode

MCMB was powdered on high-density polyethylene having a softening point of 120° C. into particles having an average particle size of 50 µm. Ninety-five parts by weight of the resulting particles and 5 parts by weight of PVDF were dispersed in NMP to prepare a negative electrode active material paste. The paste was applied to 20 µm thick copper foil with a doctor blade to a thickness of 150 µm, dried at 80° C., and pressed to form a negative electrode 2 having a negative electrode active material layer 6 having a thickness of 100 µm.

Preparation of Battery

A 5 parts by weight of PVDF solution in NMP was applied to both sides of a porous polypropylene sheet (Cellguard #2400, produced by Hoechst Celanese Plastics Ltd.) as a separator 3. Before the adhesive dried, the positive electrode 1 and the negative electrode 2 were stuck to each side of the separator 3, followed by drying at 80° C. to prepare an electrode laminate.

Ten electrode laminates were laid one on another, and current collecting tabs each connected to the end of every positive or negative current collector were spot-welded among the positive electrode laminates and the negative electrode laminates, respectively, to form a single battery body in which the positive electrode laminates and the negative electrode laminates were each connected in parallel.

The battery body was immersed in an electrolytic solution consisting of 1.0 mol/dm$^3$ of lithium hexafluorophosphate in a 1:1 (by mole) mixed solvent of ethylene carbonate and dimethyl carbonate, and the impregnated battery body was sealed into an aluminum laminate film pack by heat sealing to complete a battery.

The resulting battery was charged at 500 mA to 4.2 V at an ambient temperature of 25° C. After completion of the charge, an iron nail having a diameter of 2.5 mm was put in the center of the battery to run a simulation of an internal short-circuit. As a result, the same changes in battery temperature and voltage as in FIG. 3 were observed. That is, in the instant the iron nail was put in (time 0), the terminal voltage fell to 0 V but was gradually restored with time. The voltage restoration seems to be because heat was generated at the short-circuited part immediately after the short-circuit whereby the electrically conductive polymer having PTC characteristics in the vicinities of the short-circuited part functioned to cut off the electronic conducting path to the active material to thereby decay the short-circuit current.

The present invention is applicable to the electrode for Electrolysis apparatus, the electrode for electro-plating the electrode for liquid crystal display and so on.

As described above, the electrode according to the present invention comprises an active material, an electronic conducting material in contact with the active material, and an electronic conducting current collector to which the active material and the electronic conducting material are bonded with a binder, in which the active material, electronic conducting material or electronic conducting current collector has the property of increasing its resistance with a rise in temperature. Accordingly, in case of an internal short-circuit, the PTC function of the active material, the electronic conducting material or the electronic conducting material constituting the current collector which is in the path of the short-circuit current works to decay the short-circuit current thereby suppressing a rise in temperature. In the case that only electronic conducting current collector has the property of increasing its resistance with a rise in temperature, it is required that electrode active material layer is made of an plurality of parts electrical isolated each other for improving a safety.

Where the active material is composed of a part having an electrode activity and a part having no electron activity, with the part having no electron activity exhibiting the property of increasing its resistance with a rise in temperature, the resistance to reaction of the active material increases at the time of a short-circuit to control the rise in temperature.

Where the active material is made up of secondary particles comprising a plurality of active material particles to which electronic conducting particles having the property of increasing the resistance with a rise in temperature are clinging, the resistance to reaction of the active material increases at the time of a short-circuit to control the rise in temperature.

The electronic conducting current collector can be endowed with PTC characteristics by the structure composed of metal to which an electronic conducting material having the property of increasing its resistance with a rise in temperature is joined.

Where the electronic conducting material is a polymer having a softening point lower than 150° C., the polymer melts by the heat of a short-circuit. Where the polymer is applied to the active material, the melt cuts both the electron conducting path and the ion conducting path to increase the resistance to electron conduction. Where the polymer is applied to the electron conducting material, the melt cuts the electron conducting path.

The battery according to the present invention comprises a positive electrode, a negative electrode, and an electrolytic solution held between the positive and negative electrodes, in which the above-described electrode endowed with PTC characteristics is used as a positive or negative electrode. The battery is of high safety because the temperature rise in case of an internal short-circuit can be suppressed.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. In a battery including positive and negative electrodes, each including an active material capable of storing energy, the improvement comprising:

at least one of said positive electrode and negative electrode including, an electronic conducting current collector, and an electrode active material layer formed on said electronic conducting current collector and including active material particles and electronic conducting material particles, wherein said electronic conducting material particles exhibit a positive temperature coefficient (PTC) characteristic in which resistance increases as a function of a rise in temperature thereof so as to decay a short circuit current flowing through said electrode active material layer after a short circuit therein and gradually restore a voltage of said battery; and wherein said electronic conducting material particles comprise a polymer having a softening point not higher than 150° C.

2. In a battery including positive and negative electrodes, each including an active material capable of storing energy, the improvement comprising:

at least one of said positive electrode and negative electrode including, an electronic conducting current collector, and an electrode active material layer formed on said electronic conducting current collector and including active material particles and electronic conducting material particles, wherein said electronic conducting material particles exhibit a positive temperature coefficient (PTC) characteristic in which resistance increases as a function of a rise in temperature thereof so as to decay a short circuit current flowing through said electrode active material layer after a short circuit therein and gradually restore a voltage of said battery; and, wherein said electronic conducting material particles comprise a mixture of material that expands during a short circuit and electrically conductive particles combined in a ratio with said active material particles so as to achieve said PTC characteristic.

3. The battery of claim 2, wherein said electrode active material layer further comprises a binder, and said active material particles, electronic conductive material particles and said binder mixed in a ratio which comprises 10 parts by weight of said electronic conducting material particles, 85 parts by weight of said active material particles and 5 parts by weight of said binder.

4. The battery of claim 2, wherein said material that expands during a short circuit comprises polymer particles and said electrically conductive particles include carbon containing particles.

5. The battery of claim 4, wherein said polymer particles comprise PE particles.

6. In a battery including positive and negative electrodes, each including an active material capable of storing energy, the improvement comprising:

at least one of said positive electrode and negative electrode including, an electronic conducing current collector, and an electrode active material layer formed on said electronic conducting current collector and including active material particles and electronic conducting material particles, wherein said electronic conducting material particles exhibit a positive temperature coefficient (PTC) characteristic in which resistance increases as a function of a rise in temperature thereof so as to decay a short circuit current flowing through said electrode active material layer after a short circuit therein and gradually restore a voltage of said battery, wherein said electronic conducting material particles comprise one of $BaTiO_3$, $BaTiO_3$ doped with Sr and $BaTiO_3$ doped with Pb and mixed with said active material particles so as to achieve said PTC characteristic, and wherein said electrode active material layer further comprises a binder, and said ratio comprises 10 parts by weight of said electronic conducting material particles, 85 parts by weight of said active material particles and 5 parts by weight of said binder.

7. In a battery including positive and negative electrodes, each including an active material capable of storing energy, the improvement comprising:

at least one of said positive electrode and negative electrode including, an electronic conducting current collector, and an electrode active material layer formed on said electronic conducting current collector and including active material particles and electronic conducting material particles, wherein said electronic conducting material particles exhibit a positive temperature coefficient (PTC) characteristic in which resistance increases as a function of a rise in temperature thereof so as to decay a short circuit current flowing through said electrode active material layer after a short circuit therein and gradually restore a voltage of said battery, and wherein the electronic conducting material particles have an average particle size of 10 $\mu$m.

8. In a battery including positive and negative electrodes, each including an active material capable of storing energy, the improvement comprising:

at least one of said positive electrode and negative electrode including, an electronic conducting current collector, and an electrode active material layer formed on said electronic conducting current collector and including active material particles and electronic conducting material particles, wherein said electronic conducting material particles exhibit a positive temperature coefficient (PTC) characteristic in which resistance increases as a function of a rise in temperature thereof so as to decay a short circuit current flowing through said electrode active material layer after a short circuit therein and gradually restore a voltage of said battery, wherein said electronic conducting material particles have an electrical conductivity of 5 S/cm at room temperature and 5 $\mu$S/cm at 120° C.

9. In a battery including positive and negative electrodes, each including an active material capable of storing energy, the improvement comprising:

at least one of said positive electrode and negative electrode, including, an electronic conducting current collector, and an electrode active material layer formed on said electronic conducting current collector, comprising, conductive active material particles dispersed on a material that expands during a short circuit, said conductive active material particles and said expansion material forming secondary particles, wherein said secondary particles exhibit a positive temperature coefficient (PTC) characteristic in which resistance increases as a function of a rise in temperature thereof so as to decay a short circuit current flowing through said electrode active material layer after a short circuit therein and gradually restore a voltage of said battery.

10. The battery of claim 9, wherein said material that expands during a short circuit comprises a polymer having a softening point not higher than 150° C.

11. The battery of claim 9, further comprising:

an electrolyte provided between said positive electrode and said negative electrode.

12. The battery of claim 9, wherein said active material layer further comprises a binder, at a ratio of 95 parts of said secondary particles and 5 parts of said binder.

13. The battery of claim 9, wherein said active material layer further comprises a binder and graphite at a ratio of 85 parts of said secondary particles of 10 parts of said graphite to 5 parts of said binder.

14. In a battery including positive and negative electrodes, each including an active material capable of storing energy, the improvement comprising:

at least one of said positive electrode and negative electrode, including, an electronic conducting current collector comprising a conductive plate, an electrode active material layer, isolated with an insulating material or space into a plurality of regions, formed on said electronic conducting current collector, and a positive temperature coefficient (PTC) material layer formed between said electronic conducting current collector and said electrode active material layer, said PTC material layer being in direct contact with said electrode active material layer, and said PTC material layer exhibiting a PTC characteristic in which resistance increases as a function of a rise in temperature thereof so as to decay a short circuit current flowing through a region of said plurality of regions of said electrode active material layer after a short circuit in said region and gradually restore a voltage of said battery;

wherein said PTC material layer has an electrical conductivity of 5 S/cm at room temperature and 5 µS/cm at 120° C.

15. In a battery including positive and negative electrodes, each including an active material capable of storing energy, the improvement comprising:
- at least one of said positive electrode and negative electrode, including,
- an electronic conducting current collector comprising a conductive plate, said electronic conducting current collector exhibiting a positive temperature coefficient (PTC) characteristic in which resistance increases as a function of a rise in temperature thereof, and
- an electrode active material layer, isolated with an insulating material or space into a plurality of regions, formed on said electronic conducting current collector, said active material layer being in direct contact with said electronic conducting current collector,
- wherein the electronic conducting current collector exhibiting said PTC characteristic decays a short circuit current flowing through a region of said plurality of regions of said electrode active material layer after a short circuit in said region and gradually restores a voltage of said battery;
- wherein said electronic conducing current collector comprises a polymer sheet having conductive particles in a proportion so as to achieve said PTC characteristic; and wherein said proportion comprises 70% by weight of said conductive particles to 30% by weight of polymer.

16. In a battery including positive and negative electrodes, each including an active material capable of storing energy, the improvement comprising:
- at least one of said positive electrode and negative electrode, including,
- an electronic conducting current collector comprising a conductive plate, said electronic conducting current collector exhibiting a positive temperature coefficient (PTC) characteristic in which resistance increases as a function of a rise in temperature thereof, and
- an electrode active material layer, isolated with an insulating material or space into a plurality of regions, formed on said electronic conduction current collector, said active material layer being in direct contact with said electronic conducting current collector,
- wherein the electronic conducting current collector having said PTC characteristic decays a short circuit current flowing through a region of said plurality of regions by said electrode active material layer after a short circuit in said region and gradually restores a voltage of said battery;
- wherein said electronic conducting current collector has an electrical conductivity of 5 S/cm at room temperature and 5 µS/cm at 120° C.

* * * * *